(12) United States Patent
Krause et al.

(10) Patent No.: US 8,117,099 B1
(45) Date of Patent: Feb. 14, 2012

(54) BILLING SYSTEMS CONVERSIONS

(75) Inventors: Alan S. Krause, Fairway, KS (US);
Shelby M. Martin, Overland Park, KS (US); Thomas William McAllister, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 1246 days.

(21) Appl. No.: 11/434,306

(22) Filed: May 15, 2006

(51) Int. Cl.
*G07F 19/00* (2006.01)
*G06F 17/50* (2006.01)

(52) U.S. Cl. .............................. 705/34; 705/30; 716/136

(58) Field of Classification Search ........................ None
See application file for complete search history.

(56) References Cited

U.S. PATENT DOCUMENTS

| | | | |
|---|---|---|---|
| 5,974,248 A * | 10/1999 | Graef | 703/22 |
| 6,996,589 B1 * | 2/2006 | Jayaram et al. | 1/1 |
| 2006/0236049 A1 * | 10/2006 | Iwamura | 711/162 |

* cited by examiner

*Primary Examiner* — Faris Almatrahi

(57) ABSTRACT

A computer implemented method for converting a business account from a source billing system to a target billing system is provided. The method includes designing a conversion engine, testing the conversion engine, and executing the conversion engine to convert the business account from the source billing system to the target billing system. The conversion engine includes back-out points at which the conversion engine may return the business account to the source billing system.

18 Claims, 5 Drawing Sheets

BILLING SYSTEMS CONVERSIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to billing systems, and more particularly, but not by way of limitation, to a method and a system for billing systems conversions.

BACKGROUND OF THE INVENTION

Because embodiments of the present disclosure apply to a broad range of billing systems conversions, any telecommunications industry examples are offered for illustrative purposes only, and not as a limitation for the present disclosure. A business may use a billing system to record customer data to submit bills for goods sold or services provided to customers of the business. The billing system may include a business account for the business, and the business account may include a customer account for each customer. The business account may also include party data, data that identifies each customer, reference data, data that identifies each price plan, and production data, data associated with the use of a service by each customer. A price plan is a method that determines the amount to be billed to each customer based upon the use of a service by the customer. A business may periodically request to convert its business account from a current billing system, or source billing system, to a billing system to be used, or target billing system. A conversion process extracts data, such as party data, reference data, and production data, from the source billing system, translates the data for the target billing system, and loads the data in the target billing system so that the business may use the target billing system.

SUMMARY OF THE INVENTION

In one embodiment, a method for converting a business account from a source billing system to a target billing system is provided. The method includes designing a conversion engine, testing the conversion engine, and executing the conversion engine to convert the business account from the source billing system to the target billing system. The conversion engine includes back-out points at which the conversion engine may return the business account to the source billing system.

In another embodiment, a system for converting a business account from a source billing system to a target billing system is provided. The system includes a design component to design a conversion engine, a test component to test the conversion engine, and an execute component to execute the conversion engine to convert the business account from the source billing system to the target billing system. The conversion engine includes back-out points at which the conversion engine may return the business account to the source billing system.

In yet another embodiment, a method for converting a business account from a source billing system to a target billing system is provided. The method includes designing a conversion engine, testing the conversion engine, and executing the conversion engine to convert the business account from the source billing system to the target billing system. Testing the conversion engine includes testing each customer account in the business account using a copy of production data.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

Figure 1:
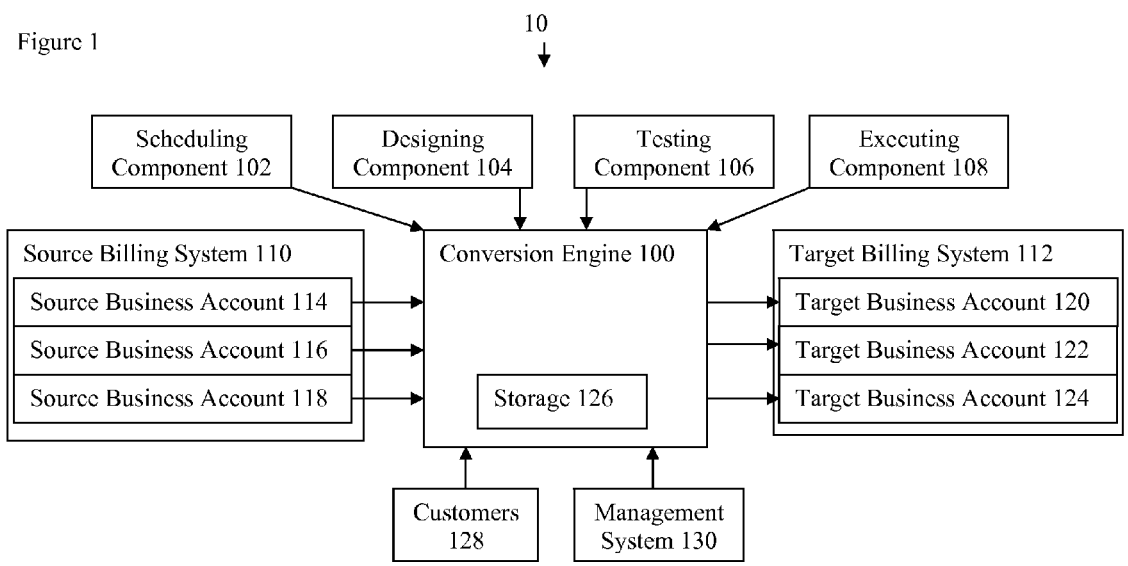
FIG. 1 illustrates an exemplary system suitable for implementing the several embodiments of the present disclosure.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

A conversion team may use a conversion engine during a conversion process to convert a business account from a source billing system to a target billing system. A challenge presented during the conversion process for a business account with a large number of customers is rates of conversion errors that are too high. A conversion error is the failure to convert party data for each customer account, reference data for each price plan, or production data associated with each customer account, from the source billing system to the target billing system. A challenge presented during the conversion process for a billing system that offers continuous production data access to customers is the need to minimize outage time. Outage time is the duration during which a customer temporarily may not be able to access the production data associated with the customer in the billing system. A customer may be an end user of a service, or a customer may be a customer support group within a business that provides the service.

When the conversion engine converts the business account to the target billing system, the conversion process may create too many conversion errors. Embodiments of the present disclosure provide a method for a conversion engine that includes back-out points at which the conversion engine may return the business account being converted to the source billing system when the rate of conversion errors are too high. The back-out points are points at which a conversion engine may be stopped to return a business account to a source billing system. The conversion team may use the conversion errors to modify the conversion engine in order to reduce the conversion errors during the next execution of the conversion engine.

Without an accurate estimate of the outage time required for a conversion, scheduling the conversion may result in a lengthy outage time for customers. Embodiments of the present disclosure provide a method for a conversion engine that tests each customer account in the business account being converted using production data. Testing each customer account using production data provides for improved estimates for outage time, which enables the scheduling of a conversion that minimizes outage time for customers. Testing each customer account may include the implementation of a test environment that more closely simulates the target billing system, producing a more accurate simulation. Additionally, testing each customer account also provides the opportunity to detect invalid data in each customer account during the conversion process.

Turning now to FIG. 1, a system 10 for billing systems conversions is depicted. The system 10 includes a conversion engine 100 coupled with a scheduling component 102, a designing component 104, a testing component 106, and an executing component 108. The scheduling component 102 schedules the executing component 108 to execute the conversion engine at a specified time and a specified date. The designing component 104 is a tool that either designs the conversion engine 100 or configures a commercially available extract-translate-load tool to function as the conversion engine 100. The testing component 106 tests components and processes in the conversion engine 100. The executing component 108 executes the conversion engine 100 to convert a business account from a source billing system 110 to a target billing system 112. The source billing system 110 may include multiple business accounts, such as a source business account 114, a source business account 116, and a source business account 118. The target billing system 112 may also include multiple business accounts, such as a target business account 120, a target business account 122, and a target business account 124. The conversion engine 100 may convert the source business account 114 to the target business account 120. The conversion engine 100 includes a storage 126 used for storing usage, or current production data, from customers 128. Alternatively, the storage 126 may be in the target billing system 112. Additionally, the conversion engine 100 may be coupled with a management system 130 to verify data converted to the target billing system 112.

Figure 2:
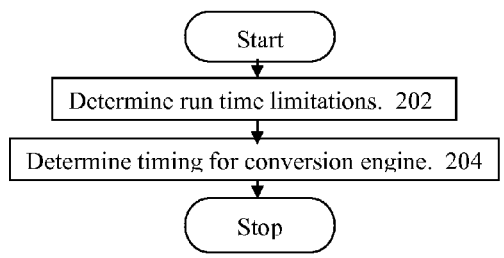
FIG. 2 is a flow chart of a method for a scheduling component according to an embodiment of the present disclosure.

The scheduling component 102 enables embodiments of the present disclosure to provide a method that minimizes outage time. Turning now to FIG. 2, a flow chart depicts a method for the scheduling component 102 according to an embodiment of the present disclosure. The scheduling component 102 schedules the executing component 108.

In box 202, the scheduling component 102 determines run time limitations. Run time limitations are logistical factors that determine when the conversion engine 100 may be executed. The scheduling component 102 determines when the conversion engine 100 may be run, or executed, such as on a weeknight or during a weekend. Other run time limitations may include the maximum allowable outage time and any related systems that may be down during weeknights or weekends. The scheduling component 102 combines all of the run time limitations factors to schedule the executing component 108 to execute the conversion engine 100 at a specified time and day of the week.

In box 204, the scheduling component 102 determines timing for the conversion engine 100. Timing for the conversion engine 100 is based on business factors that determine when the conversion engine 100 may be executed. For example, if the scheduling component 102 determines the timing for the conversion engine 100 is based on the billing cycle, the scheduling component 102 schedules the executing component 108 to execute the conversion engine 110 on the first day of the billing cycle. The scheduling component 102 combines the run time limitations factors and timing for the conversion engine 100 to schedule the executing component 108 to execute the conversion engine 100 at a specified time and a specified date.

Figure 3:
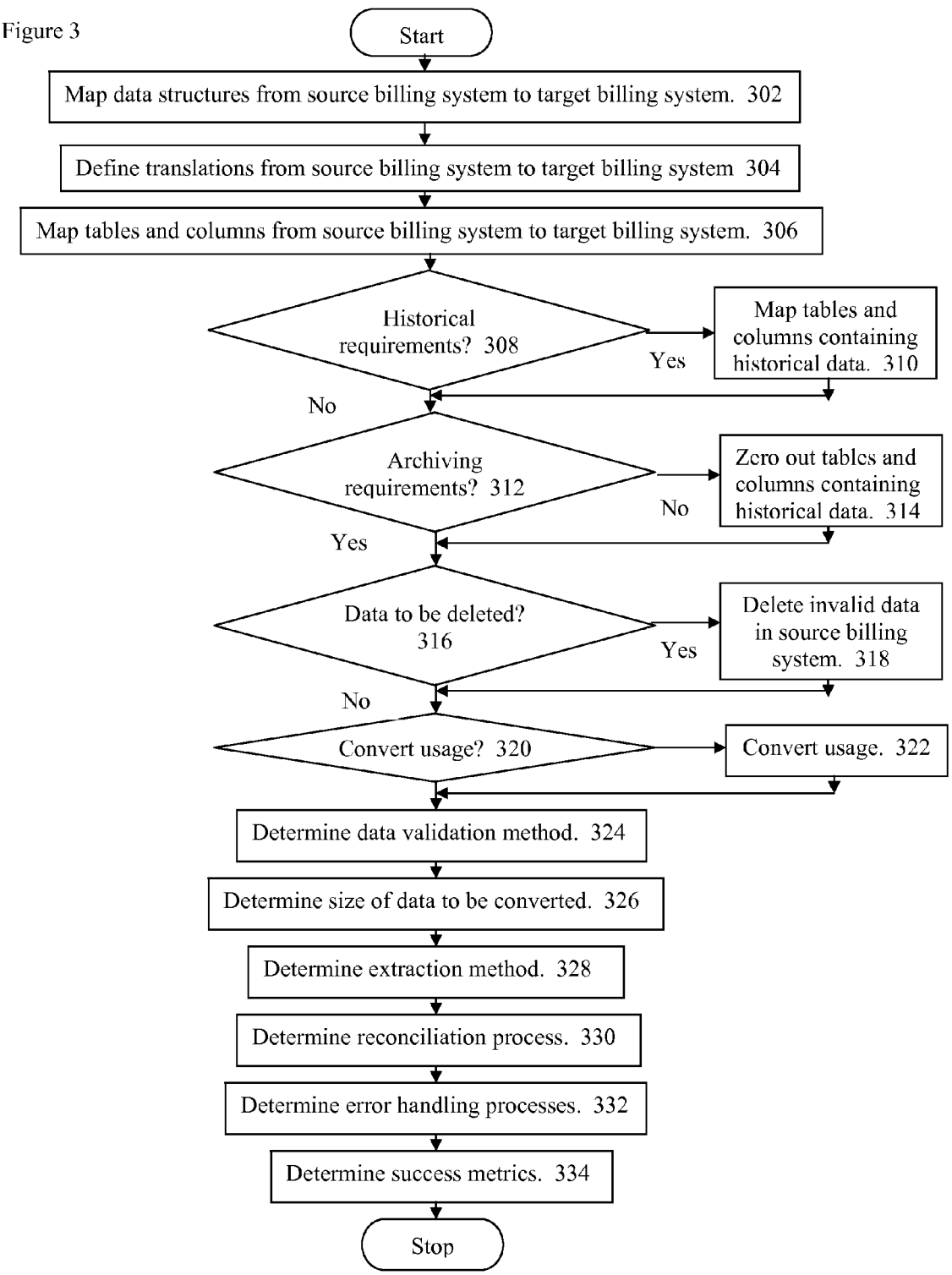
FIG. 3 is a flow chart of a method for a designing component according to an embodiment of the present disclosure.

The designing component 104 enables embodiments of the present disclosure to provide methods that reduce conversion errors and minimize outage time. Turning now to FIG. 3, a flow chart depicts a method for the designing component 104 according to an embodiment of the present disclosure. When the data structures for the target billing system 112 are defined, the designing component 104 may begin to design the conversion engine 100.

In box 302, the designing component 104 maps data structures from the source business account 114 to the target business account 120. The designing component 104 designs the conversion engine 100 to map the large data structures, such as customer accounts, between the two billing systems. For example, the designing component 104 maps customer accounts from the source business account 114 to customer accounts in the target business account 120.

In box 304, the designing component 104 defines translations from the source business account 114 to the target business account 120. When a direct mapping is not possible between the two systems, the designing component 104 designs the conversion engine 100 to define a translation to convert data between the two systems. For example, a customer account in the source business account 114 may include data for a subscription plan, whereas a customer account in the target business account 120 may include only a pointer to data for a subscription plan. Based on this example, the designing component 104 defines a translation to convert data for the subscription plan, along with all the other data in the customer account in the target billing system 112, and load this converted data for the subscription plan in a separate location in the target billing system 112 instead of in the customer account in the target billing system 112.

In box 306, the designing component 104 maps tables and columns from the source business account 114 to the target business account 120. When a direct mapping is possible between the two systems, the designing component 104 designs the conversion engine 100 to map the tables and columns associated with each large data structure between the two systems. A table or a column may be a subset of a large data structure in the two systems.

In box 308, the designing component 104 determines historical requirements. Historical requirements specify considerations for converting stored data. The designing component 104 determines whether historical data will be converted from the source billing system 110 to the target billing system 112, and for which customer accounts historical data will be converted. For example, the designing component 104 may determine that historical data of thirty days will be converted for the customers 128 with active accounts only. If the designing component 104 determines that historical data will be converted, the method proceeds to box 310. In box 310, the designing component 104 designs the conversion engine 100 to map from tables and columns containing historical data in the source billing system 110 to tables and columns for containing historical data in the target billing system 112. Then the method proceeds to box 312. If the designing component 104 determines that historical data will not be converted, the method proceeds to box 312.

In box 312, the designing component 104 determines archiving requirements. Archiving requirements specify considerations for retaining historical data. For example, at the end of the current billing cycle the source billing system 110 may still contain data stored prior to the conversion of the source business account 114. The source billing system 110 may use this data to generate a partial bill for the current billing cycle. If the designing component 104 determines that historical data will not be archived in the source billing system 110, the method proceeds to box 314. In box 314, the designing component 104 designs the conversion engine 100 to zero out tables and columns containing historical data in the source billing system 110 after the conversion engine 100 converts the historical data. Then the method proceeds to box 316. If the designing component 104 determines that historical data will be archived in the source billing system 110, the method proceeds to box 316.

In box 316, the designing component 104 determines invalid data to be deleted. Based on parameters set for data in the source billing system 110, the designing component 104 designs the conversion engine 100 to determine what data in the source billing system 100 is invalid. If the designing component 104 determines that invalid data will be deleted in the source billing system 110, the method proceeds to box 318. In box 318, the designing component 104 designs the conversion engine 100 to delete invalid data in the source billing system 110 prior to converting any data in the source billing system 110. Then the method proceeds to box 320. If the designing component 104 determines that invalid data will not be deleted in the source billing system 110, the method proceeds to box 320.

In box 320, the designing component 104 determines whether to convert usage. Usage is current production data, or current data associated with the use of a service by each customer. If the scheduling component 102 schedules the executing component 108 to execute the conversion engine 100 on the first day of the billing cycle, the source billing system 110 contains no usage, such that the conversion engine 100 does not convert any usage. However, if the scheduling component 102 schedules the executing component 108 to execute the conversion engine 100 after the first day of the billing cycle, the source billing system 110 contains usage, such that the conversion engine 100 converts usage. If the conversion engine 100 is to convert usage, the method proceeds to box 322. In box 322, the designing component 104 designs the conversion engine 100 to convert usage from the source billing system 110 to the target billing system 112. Then the method proceeds to box 324. If the conversion engine 100 is not to convert usage, the method proceeds to box 324.

In box 324, the designing component 104 determines a data validation method. A data validation method specifies when converted data is verified. For example, the designing component 104 may determine to validate data during conversion by comparing data loaded into the target billing system 112 with data in the source billing system 110. For this example, the designing component 104 designs the conversion engine 100 to validate data during conversion by comparing data loaded into the target billing system 112 with data in the source billing system 110.

In box 326, the designing component 104 determines the size of data to be converted during a conversion event. A conversion event is the full conversion process for converting an amount of data. For example, if the designing component 104 determines the size of data to be converted during one conversion event is the same size as an individual customer account, then any error detected during the conversion process would trigger only the reprocessing of the individual customer account on its own. In contrast, if in some embodiments the designing component 104 determines the size of data to be converted during one conversion event is the size of many individual customer accounts, the conversion process completes in less time. However, any error detected during such a conversion event triggers the reprocessing of many individual customer accounts, including successfully converted individual customer accounts. The designing component 104 designs the conversion engine 100 to determine the size of data converted during one conversion event from the source billing system 110 to the target billing system 112.

In box 328, the designing component 104 determines an extraction method. An extraction method specifies when data is copied. If the designing component 104 determines to extract data from a copy of production data, the impact on the customers 128 still accessing the source billing system 110 is minimized. In contrast, the impact on customers is greater if the designing component 104 determines to extract data from live production data. If the designing component 104 determines to extract data from a copy of production data that is recorded during a short outage, the designing component 104 designs the conversion engine 100 to extract data from a copy of production data in the source billing system 110.

In box 330, the designing component 104 determines a reconciliation process. A reconciliation process specifies a method for verifying data. The designing component 104 determines what data is reconciled after conversion from the source billing system 110 to the target billing system 112, and the reports or queries that the conversion engine 100 generates to facilitate the reconciliation process. The designing component 104 designs the conversion engine 100 to generate reports or queries to reconcile data that is converted from the source billing system 110 to the target billing system 112. The designing component 104 also inserts back-out points in the conversion engine 100. These back-out points are inserted after points where reports or queries are used to reconcile data. The option exists at these back-out points for the conversion engine 100 to return the source business account 114 to the source billing system 110 based upon the failure to meet specified success metrics for the reconciliation process. Examples of back-out points may include a back-out point when the conversion engine extracts data from the source billing system, specified later in box 506, when the conversion engine loads data from the source billing system to the target billing system, specified later in box 514, and when the conversion engine updates indicators to point to the target billing system, specified later in box 522.

In box 332, the designing component 104 determines the error handling processes. The designing component 104 determines what errors are generated during conversion from the source billing system 110 to the target billing system 112, and the reports or files that the conversion engine 100 generates to facilitate the error handling process. The designing component 104 designs the conversion engine 100 to generate reports or files to handle errors during the conversion from the source billing system 110 to the target billing system 112. The designing component 104 also designs the conversion engine 100 to handle errors during the conversion from the source billing system 110 to the target billing system 112, such as handling errors by re-running data that generated errors back through the conversion engine 100.

In box 334, the designing component 104 determines success metrics. Success metrics specify error rates and timing that are acceptable for the conversion engine 100. The designing component 104 determines what success metrics, or error percentages, and timing are acceptable during conversion from the source billing system 110 to the target billing system 112. For example, a success metric of ninety-nine percent may specify that an error rate of one percent or less is acceptable during conversion, and a success metric for timing may specify the amount of time required for a part of the conversion process. The designing component 104 designs the conversion engine 100 to require that a success metric is met at various back-out points during the conversion from the source billing system 110 to the target billing system 112 for the conversion engine 100 to continue the conversion process instead of returning the source business account 114 to the source billing system 110.

When the designing component 104 completes the method to design the conversion engine 100, the conversion team may write the conversion code for the conversion engine 100. Alternatively, the conversion team may purchase an extract-translate-load tool that is commercially available and use the designing component 104 to configure the extract-translate-load tool to function as the conversion engine 100. After the designing component 104 designs the conversion engine 100, the testing component 106 tests the conversion engine 100.

Figure 4:
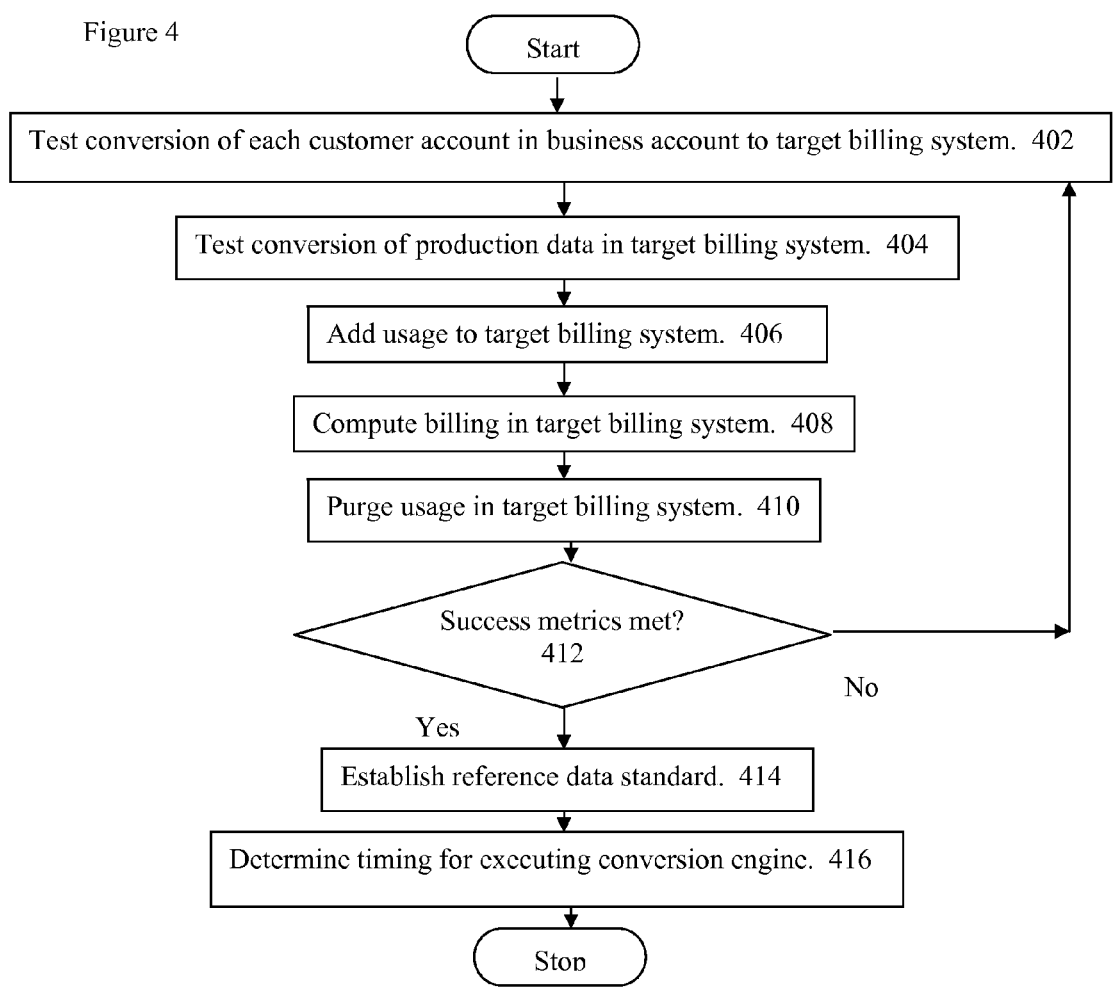
FIG. 4 is a flow chart of a method for a testing component according to an embodiment of the present disclosure.

Turning now to FIG. 4, a flow chart depicts a method for the testing component 106 according to an embodiment of the present disclosure. In an embodiment of the present disclosure, the method for testing has two versions of the same testing method, dry runs and dress rehearsals. A dry run tests whether data is accurately converted, and is verified by comparing converted data to the data before conversion. A dress rehearsal occurs when all business employees who are scheduled to participate in the conversion process join the members of the conversion team to time a dry run.

In box 402, the testing component 106 instructs the conversion engine 100 to test the conversion of each customer account from the source business account 114 to the target business account 120. To test the conversion of each customer account, the testing component 106 instructs the conversion engine 100 to extract a copy of data from a customer account in the source business account 114, translate the extracted data to match the data structures in the target business account 120, load the translated data in the target business account 120, and then verify the loaded data in the target business account 120. The testing component 106 instructs the conversion engine 100 to compare the data extracted, translated, and loaded in the target billing system 112 against the copy of the data in the source billing system 110.

The testing component 106 instructs the conversion engine 100 to test the conversion of each customer account, instead of testing the conversion of a sample of customer accounts, to better simulate the conversion process. To test each customer account, the conversion team sizes the conversion hardware to have the capacity to store each customer account, based upon the conversion method and the data size converted in each conversion event. The conversion team sizes the testing environment to handle the largest conversion event that occurs in production and for the testing environment to fully simulate the target billing system 112. To better simulate the conversion process, the conversion hardware and the testing environment are sized to handle the conversion of every source business account to the target billing system 112. Because the use of conversion hardware is temporary, the conversion team has the option of leasing or borrowing the conversion hardware instead of purchasing the conversion hardware.

In box 404, the testing component 106 instructs the conversion engine 100 to test a copy of production data in the target billing system 112. To test the conversion of production data, the testing component 106 instructs the conversion engine 100 to extract data from a copy of production data in source business account 114, translate the extracted data to match the data structures in the target business account 120, load the translated data in the target business account 120, and then verify the loaded data in the target business account 120. The testing component 106 instructs the conversion engine 100 to compare the production data extracted, translated, and loaded in the target billing system 112 against the copy of the production data in the source billing system 110.

Instead of testing a sample of production data, the testing component 106 instructs the conversion engine 100 to test the conversion of all production data to better simulate the conversion process. However, instead of extracting live production data, the testing component 106 instructs the conversion engine 100 to extract data from a copy of production data that is recorded during a short outage, such as at midnight. The testing component 106 instructs the conversion engine 100 to extract data from a copy of production data that is recorded during a short outage, such as at midnight, so that the impact on the customers 128 still accessing the source billing system 110 is less than if the testing component 106 instructs the conversion engine 100 to extract data from live production data. Because the testing component 106 instructs the conversion engine 100 to extract data from a copy of production data, the source billing system 110 continues to function normally without interruption.

In box 406, the testing component 106 instructs the conversion engine 100 to add usage to the target billing system 112. The testing component 106 instructs the conversion engine 100 to modify the billing system indicators to implement a dual usage feed by indicating that usage from the customers 128 is sent to both the source billing system 110 and the target billing system 112, with usage sent to the target billing system 112 initially stored in the storage 126. Implementing a dual usage feed enables the source billing system 110 to continue normal processing of usage uninterrupted and enables the target billing system 112 to process the same usage for testing purposes.

In box 408, the testing component 106 instructs the conversion engine 100 to compute billing in the target billing system 112. Based upon usage from the customers 128 initially stored in storage 126, the testing component 106 instructs the conversion engine 100 to compute billing in the target billing system 112 to produce a partial bill for the time period following implementation of the dual usage feed. The testing component 106 instructs the conversion engine 100 to also compute billing in the source billing system 110 to produce a similar partial bill. The testing component 106 instructs the conversion engine 100 to compare the partial bills from the source billing system 110 and the target billing system 112 to verify the conversion process. The testing component 106 instructs the conversion engine 100 to identify any errors from the comparison of the partial bills as the basis for modifying the conversion process.

In box 410, the testing component 106 instructs the conversion engine 100 to purge usage in the target billing system 112. The testing component 106 instructs the conversion engine 100 to modify billing system indicators to stop the dual usage feed by indicating that usage from the customers 128 is sent only to the source billing system 110 and not to the target billing system 112. The testing component 106 instructs the conversion engine 100 to also zero out usage from the customers 128 that accumulated in the storage 126 and in the target billing system 112. When the conversion engine 100 zeros out usage, the conversion engine 100 prepares the storage 126 and the target billing system 112 for either another test or for the conversion process.

In box 412, the testing component 106 instructs the conversion engine 100 to determine whether the success metrics have been met. The testing component 106 instructs the conversion engine 100 to compare the success metrics determined by the designing component 104 against the results of the tests for comparisons of partial bills, and results of the tests for loaded data in the target business account 120 for both the conversion of the customer accounts and the conversion of the production data. If the conversion engine 100 determines that the success metrics have not been met, the method returns to box 402. If the conversion engine 100 determines that the success metrics have been met, the method proceeds to box 414. The testing component 106 instructs the conversion engine 100 to identify and address conversion errors after each test to improve the error rate for subsequent tests. The testing component 106 instructs the conversion engine 100 to continue repeating the test until the error rates satisfy the success metrics.

In box 414, the testing component 106 instructs the conversion engine 100 to establish a reference data standard. After the conversion engine 100 extracts, translates, loads, and verifies the reference data for each price plan in the target business account 120, and re-runs any reference data that causes errors until the reference data no longer causes errors, the result is corrected reference data for each price plan, or a reference data standard. Any modifications made to the price plans after the final test are updated in the reference data standard.

In box 416, the testing component 106 instructs the conversion engine 100 to determine timing for executing the conversion engine 100. The timing of the final test is an estimate for the timing required when the executing component 108 executes the conversion engine 110 to convert the source business account 114 to the target business account 120.

Figure 5:
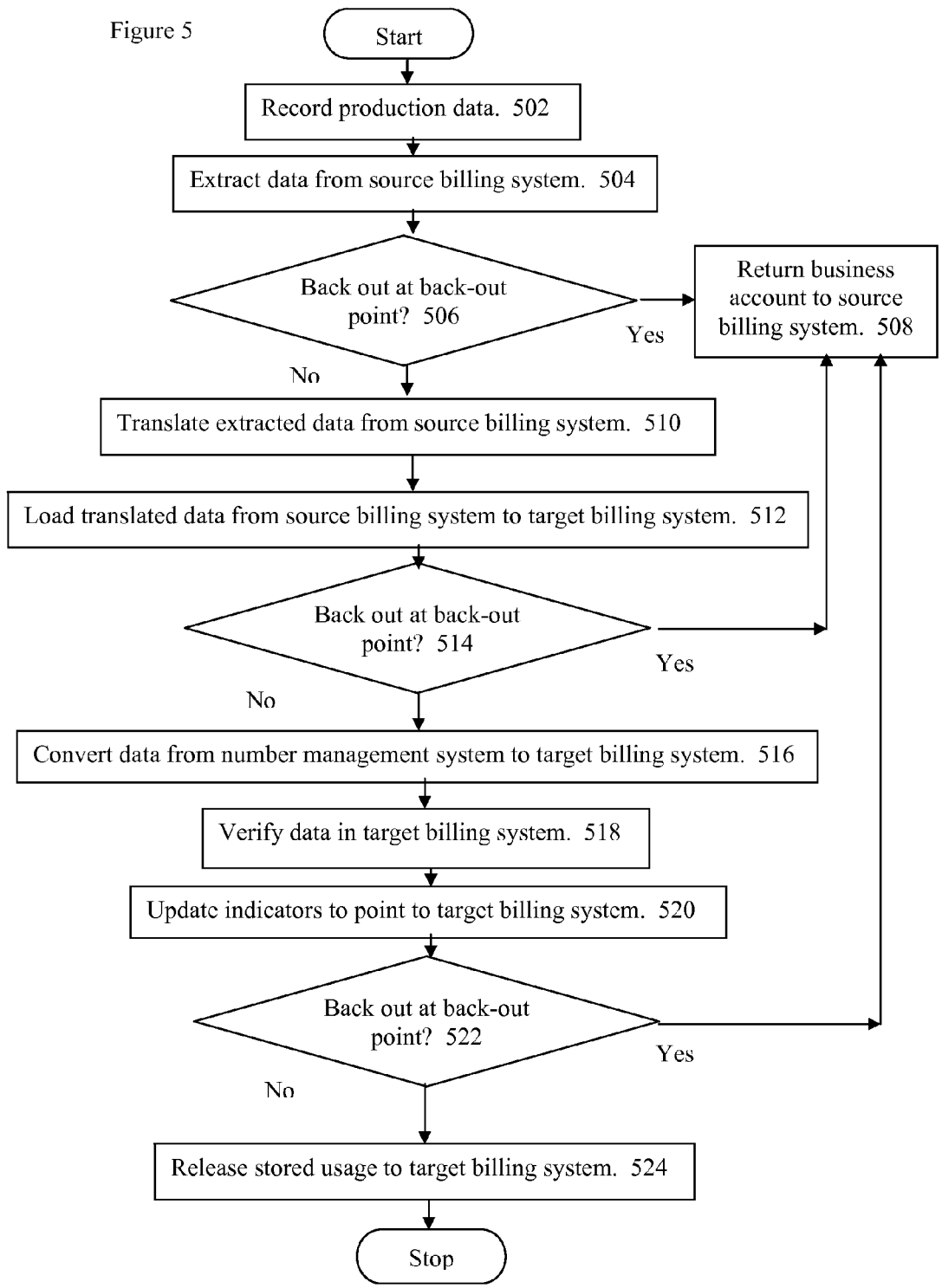
FIG. 5 is a flow chart of a method for an executing component according to an embodiment of the present disclosure.

Turning now to FIG. 5, a flow chart depicts a method for the executing component 108 according to an embodiment of the present disclosure. Based upon all of the run time limitations and the timing for conversion, the scheduling component 102 schedules the executing component 108 to execute the conversion engine 110 at a specified time on a specified date, which may be on the first day of the billing cycle. The executing component 108 may execute the conversion engine 100 to convert one source business account, any combination of source business accounts, or all source business accounts to the corresponding target business accounts.

In box 502, the executing component 108 executes the conversion engine 100 to record production data. The executing component 108 executes the conversion engine 100 to modify the billing system indicators to implement a dual usage feed by indicating that usage from the customers 128 is both sent to the source billing system 110 and sent to the target billing system 112, with usage for the target billing system 112 initially stored in the storage 126. Prior to the conversion process, usage from the customers 128 is stored only in the source business account 114. Because the target billing system 112 is not initially accessible for usage during the conversion process, usage from the customers 128 is initially stored in storage 126.

In box 504, the executing component 108 executes the conversion engine 100 to extract data from the source billing system 110. At this point, the conversion engine 100 has only extracted, or copied, data from the source billing system 110, but has not yet translated, or modified, any data.

In another embodiment of the present disclosure, in box 504 the executing component 108 may execute the conversion engine 100 to extract data from the source billing system 110 for selected customer accounts instead of for all customer accounts. If the source business account 114 contains a large number of customer accounts that are not active, the executing component 108 may execute the conversion engine 100 to extract data only for active customer accounts. By not converting inactive customer accounts, the conversion engine 100 completes in less time, resulting in a minimized outage time. The conversion engine 100 may convert a customer account that is currently inactive when a customer activates the currently inactive account.

In box 506, the executing component 108 executes the conversion engine 100 to determine whether to back out. The executing component 108 executes the conversion engine 100 to determine whether to back out based upon whether the extraction error rates and the timing required for the extraction meet success metrics specified by the designing component 104. The executing component 108 executes the conversion engine 100 to determine the extraction error rates by comparing the extracted data to the data in the source billing system 110. To meet the success metrics, the executing component 108 executes the conversion engine 100 to re-extract the data for every extraction error detected. However, for extractions that result in high extraction error rates, the time required for the conversion engine 100 to extract data and re-extract data for every extraction error detected may be greater than the time required for the extraction process to meet success metrics. If the conversion engine 100 determines to back out, the method proceeds to box 508 for the conversion engine 100 to return the source business account 114 to the source billing system 110. If the conversion engine 100 determines to not back out, the method proceeds to box 510. Providing a back-out point at which the conversion engine 100 may return the source business account 114 to the source billing system 110 ultimately reduces the rates of conversion errors for the conversion when rates of extraction errors are too high.

In box 510, the executing component 108 executes the conversion engine 100 to translate extracted data from the source billing system 110. At this point, the conversion engine 100 has translated, or modified, data extracted from the source billing system 110, but has not yet loaded, or stored, any data to the target billing system 112.

In box 512, the executing component 108 executes the conversion engine 100 to load translated data from the source billing system 110 to the target billing system 112. At this point, the conversion engine 100 has loaded translated data to the target billing system 112, but has not yet modified billing system indicators to stop the dual usage feed by indicating that usage from the customers 128 is sent only to the target billing system 112 and not to the source billing system 110.

In box 514, the executing component 108 executes the conversion engine 100 to determine whether to back out. The executing component 108 executes the conversion engine 100 to determine whether to back out based upon whether the translation and load error rates, and the timing required for the translation and the load process meet success metrics specified by the designing component 104. The executing component 108 executes the conversion engine 100 to determine the translation and load error rates while translating and loading data by comparing the translated and loaded data to either the data in the source billing system 110 or to reference data that is already loaded, such as a reference data standard. To meet the success metrics, the executing component 108 executes the conversion engine 100 to reconvert the data for every translation and load error detected. However, for translations and loads that result in high translation and load error rates, the time required for the conversion engine 100 to translate and load data and then retranslate and reload data for every translate and load error detected may be greater than the time required for the translate and load process to meet success metrics. If the conversion engine 100 determines to back out, the method proceeds to box 508 for the conversion engine 100 to return the source business account 114 to the source billing system 110. If the conversion engine 100 determines to not back out, the method proceeds to box 516. Providing a back-out point at which the conversion engine 100 may return the source business account 114 to the source billing system 110 ultimately reduces the rates of conversion errors for the conversion when rates of translation and load errors are too high.

In box 516, the executing component 108 executes the conversion engine 100 to convert data from the management system 130 to the target billing system 112. The management system 130 may contain additional data to be verified for each customer account. A significant amount of time is required if the conversion engine 100 verifies data in the management system 130 for each customer account when the conversion engine 100 accesses the management system 130 after loading each individual customer account. Therefore, the executing component 108 executes the conversion engine 100 to convert all data for verification from the management system 130 to the target billing system 112 before verifying any of the data from the management system 130 for each customer account. By converting all data for verification from the management system 130 at one time, the conversion engine 100 saves the time required for accessing the management system 130 for each customer account. Additionally, the executing component 108 executes the conversion engine 100 to load the reference data standard in the target billing system 112. Any modifications made to the price plans after the final test are updated in the reference data standard.

In box 518, the executing component 108 executes the conversion engine 100 to verify data in the target billing system 112. The executing component 108 executes the conversion engine 100 to verify data in the target billing system 112 using the converted data from the management system 130. When the conversion engine 100 detects an error while verifying data using the converted data from the management system 130, the conversion engine 100 accesses the management system 130 to verify the data in the target billing system 112. When the conversion engine 100 compares the reference data extracted, translated, and loaded in the target billing system 112 against the reference data standard loaded in the target billing system 112, the conversion engine 100 saves considerable time by not accessing the reference data in the source billing system 110.

In box 520, the executing component 108 executes the conversion engine 100 to update indicators to point to the target billing system 112. The executing component 108 executes the conversion engine 100 to modify the billing system indicators to stop implementing the dual usage feed by indicating that usage from the customers 128 is sent only to the target billing system 112 and not to the source billing system 110. After the conversion engine 100 updates the indicators, usage that has been received is sent to the target billing system 112, but usage initially stored in storage 126 is not released yet.

In box 522, the executing component 108 executes the conversion engine 100 to determine whether to back out. At this point, the executing component 108 executes the conversion engine 100 to sample usage sent to the target billing system 112 to determine whether to back out, based upon the verification of the usage sampling. If the conversion engine 100 determines to back out, the method proceeds to box 508 for the conversion engine 100 to return the source business account 114 to the source billing system 110. If the conversion engine 100 determines to not back out, the method proceeds to box 524. Providing a back-out point at which the conversion engine 100 may return the source business account 114 to the source billing system 110 ultimately reduces the rates of conversion errors for the conversion when rates of usage sampling errors are too high.

In box 524, the executing component 108 executes the conversion engine 100 to release the stored usage to the target billing system 112. The conversion engine 100 releases usage initially stored in storage 126 to the target billing system 112, which joins usage sent to target billing system 112 based on the updating of indicators. The executing component 108 may execute the conversion engine 100 to back out after usage initially stored in storage 126 is released, but at this point all usage is lost through the back-out to the source billing system 110. When the executing component 108 executes the conversion engine 100 to release the stored usage to the target billing system 112, and the target billing system 112 processes the stored usage, the conversion process is complete.

Figure 6:
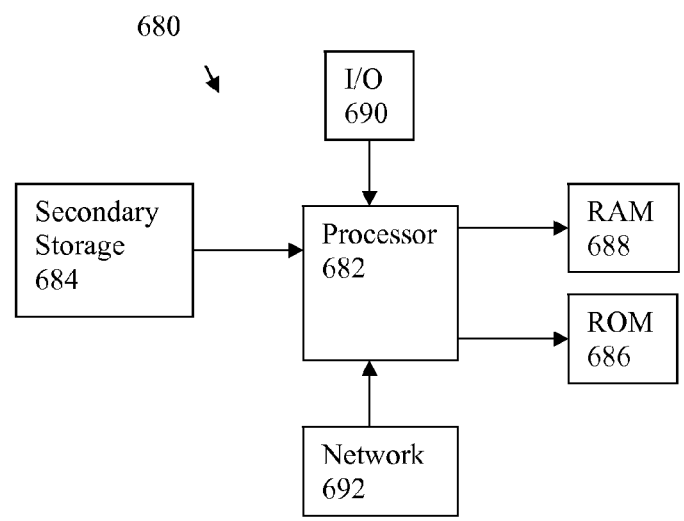
FIG. 6 illustrates an exemplary general purpose computer system suitable for implementing the several embodiments of the disclosure.

The system 10 described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) 690 devices, and network connectivity devices 692. The processor may be implemented as one or more CPU chips.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage. The RAM 688 is used to store volatile data and perhaps to store instructions. Access to both ROM 686 and RAM 688 is typically faster than to secondary storage 684.

I/O 690 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 692 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 692 devices may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity 692 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer implemented method for converting a business account from a source billing system to a target billing system, comprising:
   designing a conversion engine comprising a plurality of success metrics and a plurality of back-out points at which the conversion engine may return the business account to the source billing system when one of the plurality of success metrics is not met;
   executing the conversion engine to extract data from the source billing system, wherein the extracted data is compared to data in the source billing system to determine extraction error rates;
   executing the conversion engine to translate the data extracted from the source billing system, wherein the translated data is compared to data in the source billing system to determine translation error rates;
   executing the conversion engine to load the translated data into the target billing system, wherein the loaded data in the target billing system is compared to data in the source billing system to determine loading error rates; and
   executing the conversion engine to back out of converting the business account at one of the plurality of back-out points when at least one of an extraction error rate of the determined extraction error rates, a translation error rate of the determined translation error rates, and a loading error rate of the determined loading error rates fail to meet one of the plurality of success metrics.

2. The computer implemented method of claim 1, further comprising:
   upon determining that the extraction error rate fails to meet one of the plurality of success metrics, executing the conversion engine to back out at a back-out point and re-extract the data for each extraction error detected;
   upon determining that the translation error rate fails to meet one of the plurality of success metrics, executing the conversion engine to back out at a back-out point upon determining that the translation error rate fails to meet one of the plurality of success metrics and re-translate the extracted data for each translate error detected; and
   upon determining that the translation error rate fails to meet one of the plurality of success metrics, executing the conversion engine to back out at a back-out point and re-load the translated data for each load error rate detected.

3. The computer implemented method of claim 1, wherein executing the conversion engine to convert the business account from the source billing system to the target billing system comprises converting data from a management system to the target billing system to verify data for each customer account converted from the source billing system, wherein data is verified using the converted data from the management system.

4. The computer implemented method of claim 1, wherein executing the conversion engine to convert the business account from the source billing system to the target billing system comprises recording production data.

5. The computer implemented method of claim 1, further comprising testing the conversion engine, wherein testing the conversion engine comprises determining timing for executing the conversion engine to convert the business account from the source billing system to the target billing system.

6. The computer implemented method of claim 1, wherein executing the conversion engine to convert the business account from the source billing system to the target billing system comprises converting the business account for each customer account that is currently active and without converting each customer account that is currently inactive.

7. The computer implemented method of claim 1, wherein designing the conversion engine comprises at least one of determining historical requirements, determining archiving requirements, determining data to be cleansed, determining run time limitations, determining a size of data to be converted, determining whether to convert usage, determining timing for conversion, determining a data validation method, determining an extraction method, determining a reconciliation process, determining error handling processes, and determining success metrics.

8. A system for converting a business account from a source billing system to a target billing system, comprising:
- a non-transitory computer readable media comprising a design component executable by a processor to design a conversion engine comprising a plurality of success metrics and a plurality of back-out points at which the conversion engine may return the business account to the source billing system when one of the plurality of success metrics is not met;
- a non-transitory computer readable media comprising a test component executable by a processor to test the conversion engine; and
- a non-transitory computer readable media comprising an execute component executable by a processor to:
  - execute the conversion engine to extract data from the source billing system, wherein the extracted data is compared to data in the source billing system to determine extraction error rates,
  - execute the conversion engine to translate the data extracted from the source billing system, wherein the translated data is compared to data in the source billing system to determine translation error rates;
  - execute the conversion engine to load the translated data into the target billing system, wherein the loaded data in the target billing system is compared to data in the source billing system to determine loading error rates; and
  - execute the conversion engine to back out of converting the business account at a back-out point when at least one of an extraction error rate of the determined extraction error rates, a translation error rate of the determined translation error rates, and a loading error rate of the determined loading error rates fail to meet one of the plurality of success metrics.

9. The system of claim 8, wherein the execute component is further executable by the processor to:
- execute the conversion engine to back out at a back-out point upon determining that the extraction error rate fails to meet one of the plurality of success metrics.

10. The system of claim 8, wherein the execute component is further executable by the processor to:
- execute the conversion engine to back out at a back-out point and re-load the translated data for each load error rate detected upon determining that the translation error rate fails to meet one of the plurality of success metrics.

11. The system of claim 8, wherein the conversion engine comprises a back-out point where the conversion engine updates indicators to point to the target billing system.

12. The system of claim 8, wherein the execute component executes the conversion engine to convert data from a management system to the target billing system to verify data for each customer account converted from the source billing system, wherein data is verified using the converted data from the management system.

13. The system of claim 8, wherein the execute component executes the conversion engine to record production data.

14. The system of claim 8, wherein the test component determines timing for the execute component to execute the conversion engine to convert the business account from the source billing system to the target billing system, wherein the timing is determined based on a billing cycle associated with the business account.

15. The system of claim 8, wherein the execute component executes the conversion engine to convert the business account for each customer account that is currently active and without converting each customer account that is currently inactive.

16. The system of claim 8, wherein the designing component is operable to at least one of determine historical requirements, determine archiving requirements, determine data to be cleansed, determine run time limitations, determine a size of data to be converted, determine whether to convert usage, determine timing for conversion, determine a data validation method, determine an extraction method, determine a reconciliation process, determine error handling processes, and determine success metrics.

17. The computer implemented method of claim 1, wherein the conversion engine is further designed to require that one of the plurality of success metrics is met at each of the plurality of back-out points during the conversion from the source billing system to the target billing system in order to continue the conversion process.

18. The system of claim 8, wherein the conversion engine is further designed to require that one of the plurality of success metrics is met at each of the plurality of back-out points during the conversion from the source billing system to the target billing system in order to continue the conversion process.

* * * * *